April 19, 1966 A. F. MARTINO ETAL 3,246,515
THERMAL RESPONSIVE FLUID FLOW MEASURING PROBE
Filed Feb. 28, 1963 2 Sheets-Sheet 1

INVENTOR.
ANDREW F. MARTINO
ROBERT L. MILLER

BY McCormick, Paulding & Huber

ATTORNEYS

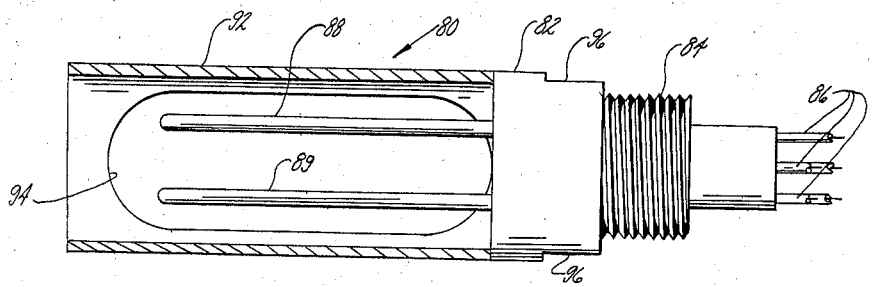
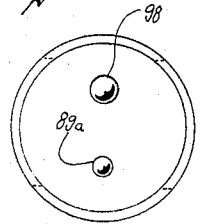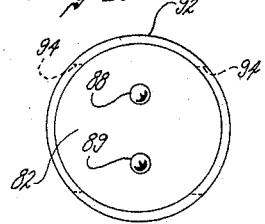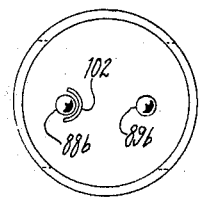
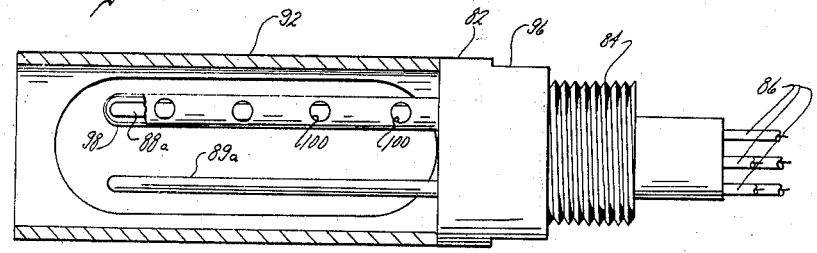
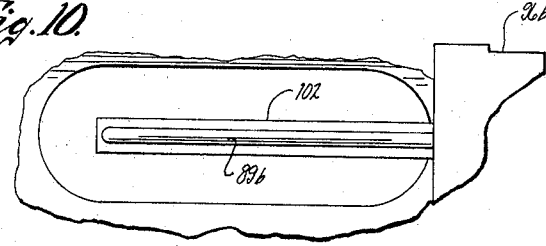

United States Patent Office 3,246,515
Patented Apr. 19, 1966

3,246,515
THERMAL RESPONSIVE FLUID FLOW MEASURING PROBE
Andrew F. Martino and Robert L. Miller, Scranton, Pa., assignors, by mesne assignments, to Dynamics Corporation of America, New York, N.Y., a corporation of New York
Filed Feb. 28, 1963, Ser. No. 261,593
14 Claims. (Cl. 73—204)

This invention relates to a probe of the type usable in fluid condition measuring devices and the like and has as one object the provision of an improved sensing element incorporating a fine temperature responsive resistance wire and which exhibits a higher degree of sensitivity and durability and dependability in use than has heretofore been obtainable.

A further object of the invention resides in the provision of a method for making a sensing element of the type mentioned which is characterized by simplicity and ready adaptation to quantity production operations.

A still further object of the invention is to provide a probe particularly well suited to use where fluid composition may vary substantially and which is capable of providing a signal proportionate to the mass flow of such a fluid.

The drawings show alternative embodiments of the probe of the invention and schematically illustrate one embodiment of the method. Embodiments shown will be described, but it will be understood that various changes may be made from the constructions and method disclosed, and that the drawing and description are not to be construed as defining or limiting the scope of the invention, the claims forming a part of this specification being relied upon for that purpose.

In the drawings:

FIG. 6 is a view partially in longitudinal section and partially in side elevation of a second probe constructed in accordance with the invention;

FIG. 7 is a left end view from FIG. 6;

FIG. 8 is a view partially in longitudinal section and partially in side elevation of a third probe constructed in accordance with the invention;

FIG. 9 is a left-hand end view from FIG. 8;

FIG. 10 is a fragmentary side elevation of a fourth probe constructed in accordance with the invention; and FIG. 11 is a left-hand end view from FIG. 10.

Probes of the general type under consideration have been employed in the past for measuring air velocity and for other purposes. Such probes are shown in Patent No. 2,800,018 to L. R. Phillips et al., Probe Device for Fluid Condition Measuring Apparatus, and in Patent No. 2,612,047 to H. O. Nilsson et al. Probe Device for Fluid Condition Measuring Apparatus, and reference may be had to these patents for detailed explanations of the associated electrical circuits and read out devices, the disclosure herein being concerned primarily with the probe per se.

Figure 1:
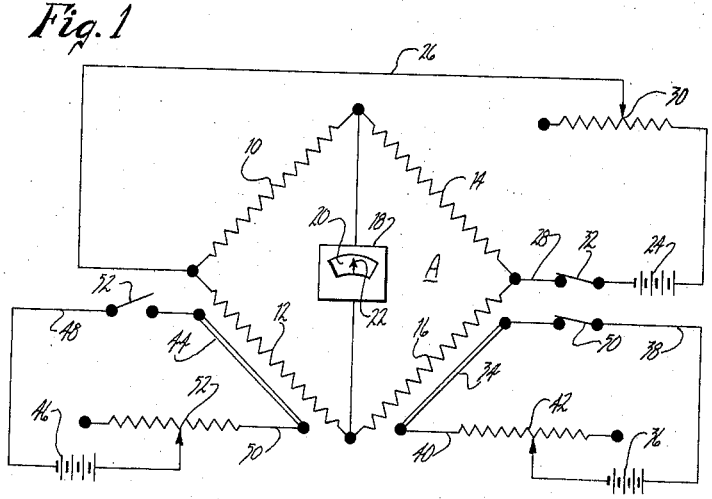
FIG. 1 is a diagrammatic view of a fluid condition measuring device in which a probe constructed in accordance with the present invention may be employed.

Referring particularly to FIG. 1, an illustrative circuit and read out device will be discussed in general terms.

A Wheatstone bridge, designated generally at A, comprises a first pair of arms 10 and 12, respectively, and a second pair of arms designated as 14 and 16, respectively. A first arm of one pair and the adjacent arm of the other pair, the arms 10 and 14 for example, are composed of a material, such as manganin, which has substantially a zero temperature coefficient of resistance. The other arms of the respective pairs, for example, the arms 12 and 16, are composed of a material which has a substantially linear and preferably a positive temperature coefficient of resistance. Other wires may be utilized, but a very fine positive temperature coefficient of resistance wire, sold under the name Balco, is presently employed for the arms 12 and 16.

A read out device comprising a current flow indicating instrument 18 is connected across the bridge between the arms of the respective pairs and includes a scale 20 and a movable indicating member 22.

Battery 24 is connected as shown by a conductor 26 between the arms of one pair, arms 10 and 12, and by a conductor 28 between the arms of the other pair, arms 14 and 16. Additionally, and adjustable resistance 30 is provided in a conductor 26 and a switch 32, which may be manually operable, is disposed in the conductor 28.

A heater wire for the resistance wire 16 is shown at 34 and is connected with a battery 36 by conductors 38 and 40. Disposed in the conductor 40 is an adjustable resistance 42. Similarly, a heater wire 44 may be provided for the resistance wire 12 and connected with a battery 46 as by conductors 48 and 50, the latter having an adjustable resistance 52 disposed therewithin.

In utilizing the aforedescribed apparatus as for example in measuring air velocity as in the aforementioned patents, one of the positive temperature coefficient resistance wires 12 and 16 may be heated while the other remains cold or, more specifically, at ambient temperature. Thus, a switch 50 in the conductor 58 is shown in a closed position for heating of the resistance wire 16 by the heater wire 34. A switch 52 in the conductor 48 is shown in an open position whereby the heater wire 44 is inoperative and the resistance wire 12 remains cold. Both of the resistance wires 12 and 16 will of course be adapted for disposition in an air stream as by incorporation in a probe.

Initial balancing of the apparatus may be accomplished during manufacture as by carefully locating the points of connection of the instrument 18 with the bridge. Such connections may then be soldered or otherwise made permanent so as to remain fixed.

After balancing and during calibration, and with the switches 32 and 50 closed as shown, the resistance wire 16 is heated and the bridge becomes unbalanced. Then, while the arms 12 and 16 are subjected to conditions of zero air flow, the flow of current to the heater wire 34 may be regulated, as by means of variable resistance 42, to effect a predetermined deflection of the indicating member 22 to some definite position corresponding to zero air flow.

With the resistance 12 and 16 disposed in an air stream, the velocity of which is to be measured, the air flowing over the heated wire 16 will of course effect cooling thereof with a consequent decrease in its electrical resistance. As is well known, the resistance wire 12 acts as a compensator for changes in temperature of the air. Thus, the bridge will tend to assume its balanced condition and this will be reflected in return movement of the indicating member 22 from its deflected position. The amount of movement of the indicating member from its deflected position will be a measure of the velocity of the air and the scale 20 may of course be suitably calibrated, as in feet per minute, to indicate such velocity.

Now, apparatus of the aforesaid type has been generally but not entirely satisfactory in use and, moreover, certain problems have been encountered in connection with the probe carrying the resistance wires such as 12 and 16. More particularly, it has been a conventional practice to employ a very fine resistance wire in a multitude of coils to provide a maximum of surface area with a minimum of mass and to thereby enhance the sensitivity of the apparatus to air velocity change. The very fine resistance wire is easily damaged and it has therefore been customary to protect the wire as by enclosing the same in a suitable tubular member. Additionally, it has been a conventional practice to employ the heater wire, such as 34, 44, as a core or mandrel and to coil the resistance wire thereabout. Such a construction is shown in the aforesaid Patent No. 2,800,018.

In service, probe sensing elements constructed in the aforesaid manner, have been found lacking to some degree in sensitivity. With a heater or other wire serving as a core and a resistance wire wrapped thereabout and enclosed by a tubular member, the ratio of surface area to mass has not been as high as might be desired. Additionally, it has been found that detrimental effects result from strain and thermal expansion and contraction of the longitudinally extending heater or other wire serving as a core or mandrel. Error is introduced due to resulting strain on the resistance wire and numerous incidents of breakage of the fine resistance wire wrapped about the heater wire have been encountered and traced to such expansion and contraction.

In accordance with the present invention, the feature of tubular protection for the fine resistance wire has been retained but a greatly improved ratio of surface area to mass has been provided for in a coreless construction. More specifically, sensing elements are constructed with a longitudinally extending empty space within a coil of resistance wire disposed in a tubular protecting member. A heater wire may also be disposed within the tubular member but in a coiled configuration and it is found that a superior sensitivity is achieved. In a coiled configuration, the heater wire does not tend to break the resistance wire as a result of thermal expansion and contraction and thus a second important improvement is achieved.

Figure 2:
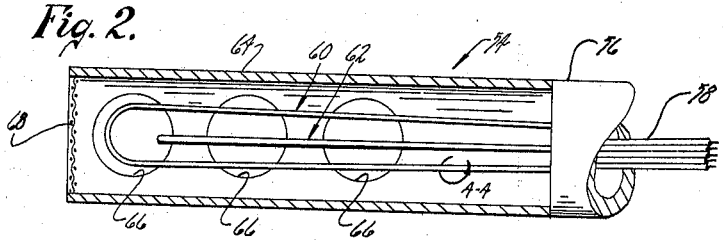
FIG. 2 is a view partially in longitudinal section and partially in side elevation of a probe constructed in accordance with the invention.
Figure 3:
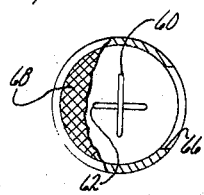
FIG. 3 is a left-hand end view partially in section from FIG. 2.

Referring now particularly to FIG. 2, it will be observed that a probe indicated generally at 54 comprises a support means 56 which may take the form of a handle, partially shown. The support means or handle 56 may be hollow as indicated for the convenient passage of connecting conductors indicated generally at 58. First and second sensing elements or sensing element sections 60, 62 are connected with and supported by the handle 56. As shown, each of the sensing elements or sensing element sections takes a hairpin or U shape and is connected at its free end with the handle or support means. The element or section 60 is slightly larger than the element or section 62, with the later being disposed generally within the former. As best illustrated in FIG. 3, the sensing elements or sections are preferably arranged approximately at right angles with respect to each other when viewed from the end.

Also connected with the handle or support means 56 is a hollow elongated shield 64 which may be generally cylindrical as shown. Similar radial openings 66, 66 are shown at one side of the shield 64 and are paired with similar diametrically opposite openings not shown. The openings 66, 66 provide for the flow of air or other fluid through the shield and over the sensing elements 60 and 62. Preferably and as shown, the shield has a wire mesh screen, such as 68, disposed therewithin at the end opposite the handle or support means 56.

Figure 4:
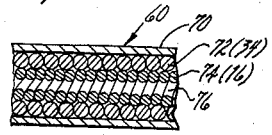
FIG. 4 is a fragmentary enlarged section taken generally as indicated at 4—4 in FIG. 2.

Referring now particularly to FIG. 4, it will be observed that the sensing element or section 60 comprises a tubular member 70 with first and second coils 72 and 74 disposed therewithin and defining a longitudinally extending open space 76. In accordance with the presently preferred practice, the heater wire 34 is disposed at least approximately in engagement with the inner wall of the tubular member. Thus, the coil 72 may be taken as representing the said heater wire. Similarly, the coil 74 may be taken as representing the aforesaid resistance wire 16. As shown, but for purposes of example only, it may be noted that the coil 72 comprises convolutions of heater wire sold under the name Evanohm and which is approximately .00275 inch in diameter. The coil 74 represents a resistance wire sold under the name Balco and which is approximately .0015 inch in diameter.

The element 62 shown in FIG. 2 may be constructed substantially identically with the element 60 shown in FIG. 4, the heater wire 34 merely being electrically disconnected for the mode of operation discussed above. Alternatively, the said element may be constructed with the heater wire 34 omitted and with only the resistance wire 16 disposed in a coiled configuration within the tube 70.

Figure 5:
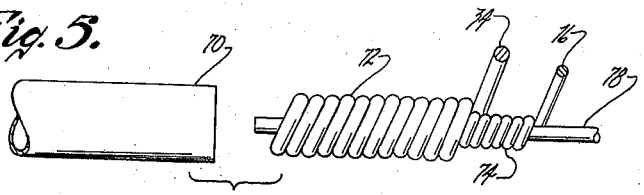
FIG. 5 is a somewhat schematic representation of the method of the present invention.

Referring particularly to FIG. 5, it will be observed that the method of the invention is illustrated diagrammatically. In accordance with the method, an elongated hollow tube such as 70 is provided. A core or mandrel such as 78 is provided and is also of elongated form. The tube 60 is preferably metallic and the core or mandrel 78, in any event, differs from the tube in respect to the material from which it is formed. A nylon core or mandrel is presently preferred but numerous substitutes may be employed as will be seen. A next step in the method involves the coiling of a resistance wire such as 16 about the mandrel to form a coil such as 74. If a single coil is to be disposed in the tube 70, a somewhat larger mandrel 78 may be employed to provide for substantial equality between the outer diameter of the coil 74 and the inner diameter of the tube. When a second coil such as 72 is to be provided about the coil 74, a mandrel 78 of the size shown may be utilized. The coil 72 may of course comprise a heater wire 34. With the resistance and heater wires wound upon the mandrel 78, the mandrel and the coils may be inserted into the tube 70 with an adhesive in engagement with the inner wall of the tube and with each of the coils. Alternatively, the adhesive may be coated upon the inner wall of the tube or upon the outer surface of the coils. Obviously, the same alternative is offered when a single coil such as 74 is to be inserted into a tube.

In the method shown, both of the coils 72 and 74 are of metallic construction and an epoxy resin is employed as an adhesive. The adhesive used, in any event, is compatible with and adheres to the tube 70 and the coil or coils entered therewithin. The adhesive is not, however, compatible with and does not adhere to the mandrel 78. Thus, after a sufficient time for setting up of the adhesive, the mandrel may be withdrawn to provide the final construction shown in FIG. 4.

In FIG. 6 there is shown an alternative construction of a probe embodying the present invention. The said probe, designated generally as 80, is of a heavy duty type and is particularly well suited to use in corrosive fluids. A base or support means 82 has a threaded portion 84 for convenient permanent mounting and conductors 86, 86 extend through the base for connection with sensing elements or element sections 88 and 89. The construction of the elements 88 and 89 may be substantially the same as that of the aforedescribed elements 60 and 62 except for overall configuration. That is, resistance and heater wires may be disposed within said elements in coiled form as described but the elements are linear rather than hairpin in shape. Additionally, the free end of each element is closed, and an open end thereof is connected to the base or support means 82. An elongated shield 92 connected with the base 82 and disposed about and in spaced relationship with the elements 88 and 89 has an opening 94 in one side. A similar opening disposed in diametrically opposite relationship with the opening 94 is shown in FIG. 7. The said openings 94, 94 provide for the flow of fluid through the shield 92 and about the sensing elements 88 and 89. As will be noted, the probe is directional and flats 96, 96 may be utilized in arranging the probe for proper flow through the openings 94, 94.

Now, the probes of FIGS. 2 and 6, as well as other probes of known design are well suited to measuring the velocity of air and other fluids where electrical circuitry of the aforedescribed type is employed and where composition of the fluid remains substantially constant. However, under conditions of varying fluid composition as for example varying density, specific heat and/or thermal conductivity, serious inaccuracies are introduced in the measurement. Thus, in applications such as the flare stacks in chemical processing plants, such probes are not fully satisfactory, substantial variation in the composition of gaseous fluids flowing through the stacks being encountered.

FIG. 8 illustrates a probe which is capable of measuring fluid in terms of mass flow and which is insensitive to change in fluid composition so as to be particularly well suited to use in flare stacks and the like. The said probe is or may be substantially identical with the probe of FIG. 6 and repetition is unnecessary. Elements in FIGS. 6 and 8 having like reference numerals may be taken as identical. Additionally, the sensing element 88a in the probe of FIG. 8 may be identical with the element 88 in FIG. 6. The heater wire core within the element 88a must however be operative. That is, it may be assumed that the switch 50 is closed in FIG. 1. The sensing element 89a may also be identical or substantially identical with the element 89 in FIG. 6. However, it is essential that the element 89a include both a resistance wire and a heater wire in coil form therewithin. Additionally, the heater wire within the element 89a must be operative. Thus, referring to FIG. 1, it is to be assumed that the switch 52 is in closed position and that the heater wire 44 is disposed in the element 89a together with the resistance wire 12.

In addition to the foregoing, a flow inhibiting means is provided in association with one of the elements 88a and 89a in the probe of FIG. 8. Said means is operative to at least partially shield the element from fluid flow and may vary widely in form. As shown, the said means comprises a closed end tubular element 98 enveloping and disposed in spaced relationship with the sensing element 88a. The tubular element 98 has openings 100, 100 therein, paired with similar diametrically opposite openings not shown, which provide for a certain amount of fluid flow over the element 88a. The element 88a is however not subject to the full effect of fluid flow as in the case of the element 89a.

With both elements heated as described with the flow inhibiting means associated with the element 88a, and with the bridge circuit A and the meter 18 appropriately calibrated, a direct reading of mass flow can be obtained from the indicating member 22 and the scale 20. That is, a reading as in pounds per minute per unit area may be obtained, or, if the scale is calibrated for a particular flow carrying conduit a reading such as pounds per minute may be obtained. Moreover, it is found that accuracy in such reading is maintained despite fluid composition changes such as changes in density, etc.

Finally, in FIGS. 10 and 11 there is shown a second probe particularly adapted for mass flow sensing. The said probe provides the added feature of being self-orienting in that readings obviously inaccurate are obtained when the probe is not properly oriented with respect to the fluid flow. First and second sensing elements 88b and 89b are located as shown for in-line relationship with flow, FIG. 11. The elements may be identical with those of FIG. 8 in construction and in connection with the electrical circuit of FIG. 1. Noting the flow arrow 102 in FIG. 11, it will be seen that the downstream element 88b is partially shielded by the upstream element 89b and that a flow inhibiting means is provided in the form of a guard 102. The guard 102 extends approximately halfway around the periphery of the element 88b and may extend throughout its length as shown. With the probe oriented as shown in FIGS. 10 and 11 an accurate mass flow reading may be obtained as above with the probe of FIG. 8. Element 88b will be only partially subject to flow while the element 89b will be under the ful effect of flow. If, on the other hand, the probe is rotated through 180° with the flats 96b, 96b reversed, the reading obtained will be obviously inaccurate.

The invention claimed is:

1. In a probe for a fluid condition measuring device or the like, the combination of a means for supporting a sensing element, and at least one sensing element connected with and supported by said means, said sensing element comprising an adhesive and a small diameter elongated tube and at least one elongated resistance wire and a heater wire, said resistance wire being of a diameter substantially less than that of the tube and having the characteristic of changing resistance with temperature change, and said resistance wire being arranged in an elongated open center coil about a longitudinal axis and being disposed in the tube, said heater wire being of a diameter substantially less than that of the tube and being coiled about the same axis as said resistance wire with an open center, and said heated wire coil being disposed in the tube in radially adjacent relationship with said resistance wire coil, and said adhesive being disposed in the tube in engagement with the tube inner wall and the resistance and heater wire coils whereby to hold the coils in fixed relationship with the tube, the adhesive being substantially clear of the open central area within the coils whereby to provide an elongated empty space within the coil.

2. The combination in a probe as set forth in claim 1 wherein the heater wire coil is disposed at least approximately in engagement with the inner wall of the tube and about the resistance wire coil with the elongated empty space defined by and within the latter.

3. In a probe for a fluid condition measuring device or the like, the combination of first and second sensing element sections each comprising an adhesive and a small diameter elongated tube section and at least one elongated resistance wire, and at least one section also including a heater wire, each said resistance wire being of a diameter substantially less than that of its tube section and having the characteristic of changing resistance with temperature change, and each said resistance wire being arranged in an elongated open center coil about a longitudinal axis and being disposed in its tube section, said heater wire being of a diameter substantially less than that of its tube section and being coiled about the same axis as said resistance wire with an open center, and said heater wire coil being disposed in its tube section in radially adjacent relationship with said resistance wire coil, and each said wire coil being engaged by said adhesive which also engages an inner wall of a corresponding tube section and which is substantially clea of the open central area within the coils to provide an elongated empty space within said coils.

4. The combination in a probe as set forth in claim 3 wherein said resistance and heater wire coils are arranged in inner-to-outer order with the heater wire at least approximately in engagement with the inner wall of the tube and with the aforesaid elongated empty space defined by and within the resistance wire.

5. The combination in a probe as set forth in claim 3 wherein there is provided a sensing element support means, and wherein said sensing element sections are structurally separate from each other and are connected with and supported by said support means.

6. The combination in a probe as set forth in claim 3 wherein there is provided a sensing element support means, wherein said sensing element sections are structurally separate from each other and are each of approximately hairpin shape with their free ends connected with said support means, and wherein an elongated hollow shield is provided and is disposed about and in spaced relationship with said sensing element sections, said shield having openings therein for the flow of fluid therethrough and over the sensing element sections.

7. The combination in a probe as set forth in claim 3 wherein there is provided a sensing element support means, wherein said sensing element sections are structurally separate from each other with the tube section of each substantially linear and respectively open and closed at opposite ends, and wherein said tube sections are connected with said support means at their open ends and in spaced relationship with each other.

8. The combination in a probe as set forth in claim 6 wherein said hairpin shaped sensing element sections are arranged substantially at right angles with respect to each other when viewed from the end.

9. The combination in a probe as set forth in claim 7 wherein there is provided an elongated hollow shield, said shield being disposed about and in spaced relationship with said sensing element sections and having openings therein so arranged that fluid flow may occur therethrough and over said elements with neither element substantially affecting flow over the other.

10. In a probe for a fluid condition measuring device or the like, the combination of first and second sensing element sections each comprising a small diameter elongated tube section, an elongated resistance wire disposed in each tube section, each of said wires being of a diameter substantially less than that of its corresponding tube section and having the characteristic of changing resistance with temperature change, and each of said resistance wires being arranged in an elongated open center coil about a longitudinal axis, an elongated heater wire disposed in at least one of said tube sections and being of a diameter substantially less than that of its corresponding tube section and being coiled about the same axis as said resistance wire with an open center, said heater wire coil being arranged in radially adjacent relationship with its corresponding resistance wire coil, an adhesive means in each of said tube sections engaging each coil therewithin and also engaging the inner wall of the tube section, and a fluid flow inhibiting means associated with one of said tube sections and operable to at least partially shield the outer surface thereof from fluid flow.

11. The combination in a probe as set forth in claim 10 wherein said flow inhibiting means is disposed in spaced relationship with said one tube section and at least partially envelops and covers the outer surface thereof.

12. The combination in a probe as set forth in claim 11 wherein said flow inhibiting means takes the form of a perforate tubular element disposed about the tube section.

13. The combination in a probe as set forth in claim 11 wherein said tube sections are arranged one behind the other in respect to the direction of fluid flow, and wherein said one section is downstream with respect to the other section.

14. The combination in a probe as set forth in claim 13 wherein said flow inhibiting means takes the form of an elongated guard extending partially around said one tube section in spaced relationship therewith and on the side thereof toward said other section.

References Cited by the Examiner

UNITED STATES PATENTS

| 1,905,232 | 4/1933 | Kercher et al. | 338—268 X |
| 2,612,047 | 9/1952 | Nilsson et al. | 73—204 X |
| 2,800,018 | 7/1957 | Phillips et al. | 73—204 |
| 3,064,335 | 11/1962 | Fletcher | 29—155.63 |
| 3,110,954 | 11/1963 | Sivacek | 29—155.63 |

FOREIGN PATENTS 996,594  9/1951  France.

RICHARD C. QUEISSER, *Primary Examiner.*

DAVID SCHONBERG, *Examiner.*